US006560823B1

United States Patent
Craig, Jr.

(10) Patent No.: US 6,560,823 B1
(45) Date of Patent: May 13, 2003

(54) METHOD FOR OPTIMIZING THE LENGTH OF THE BLANK FOR AN OPEN-TYPE CLAMP AND CLAMP MADE WITH THE USE OF THIS METHOD

(75) Inventor: Paul M. Craig, Jr., Silver Spring, MD (US)

(73) Assignee: Hans Oetiker AG Maschinen- und Apparatefabrik, Horgen (CH)

( * ) Notice: Subject to any disclaimer, the term of this patent is extended or adjusted under 35 U.S.C. 154(b) by 0 days.

(21) Appl. No.: 10/044,968

(22) Filed: Jan. 15, 2002

(51) Int. Cl.[7] ............................................... F16L 33/02
(52) U.S. Cl. .............................. 24/19; 24/20 R; 24/279
(58) Field of Search ............................. 24/20 R, 20 LW, 24/23 W, 23 EE, 20 EE, 20 TT, 20 W, 279, 19

(56) References Cited

U.S. PATENT DOCUMENTS

| 4,237,584 A | * | 12/1980 | Oetiker | ..................... 24/23 EE |
| 4,299,012 A | * | 11/1981 | Oetiker | .......................... 24/19 |
| 4,315,348 A | * | 2/1982 | Oetiker | .................. 24/20 CW |
| 4,521,940 A | * | 6/1985 | Oetiker | ....................... 24/282 |
| 4,750,242 A | * | 6/1988 | Calmettes et al. | .......... 24/20 R |
| 5,305,499 A | * | 4/1994 | Oetiker | ....................... 24/20 R |
| 5,533,235 A | * | 7/1996 | Fukuda | ....................... 24/20 R |
| 6,240,603 B1 | * | 6/2001 | Craig, Jr. | ................ 24/20 CW |
| 6,457,212 B1 | * | 10/2002 | Craig, Jr. | ..................... 24/20 R |

FOREIGN PATENT DOCUMENTS

WO   WO 2077509 A1 * 10/2002 ........... F16L/33/02

\* cited by examiner

*Primary Examiner*—James R. Brittain
(74) *Attorney, Agent, or Firm*—Paul M. Craig, Jr.

(57) ABSTRACT

A method for optimizing the length of a blank for an open-type clamp with overlapping band portions, a tightening device and a device with complementary profiles in the inner and outer clamping band portions to assure a gap-free and stepless inner clamping surface, according to which the location of the beginning of the profile at the inner clamping band portions in the condition of engagement of the mechanical connection and non-tightening of the tightening device is determined as a function of the tightening necessary to reach the diameter of $d_{max}$; by locating the transition from full band width to the profile in the inner clamping band portion with the use of this method clamping band material savings can be achieved in the clamp made in accordance with this method.

23 Claims, 4 Drawing Sheets

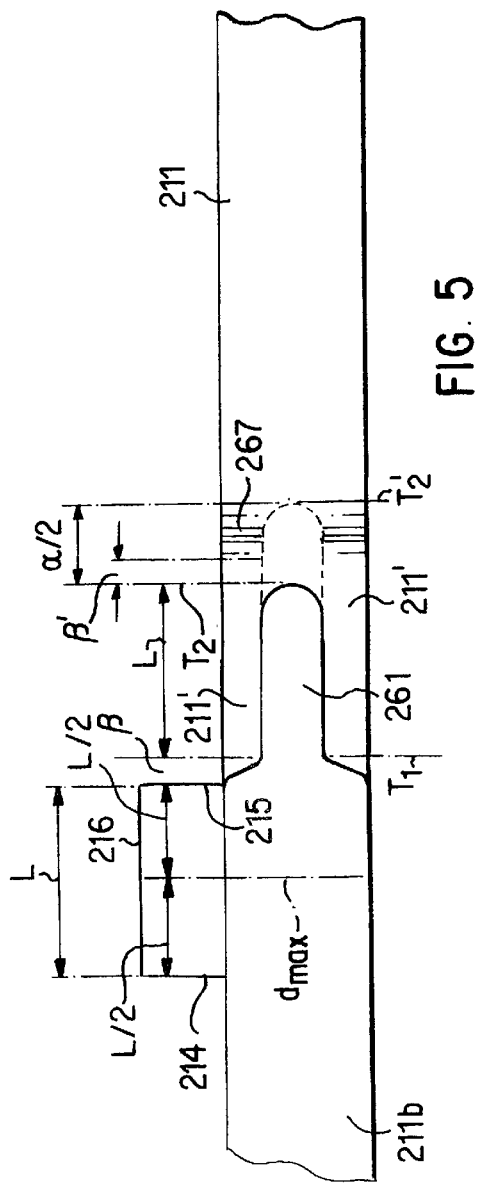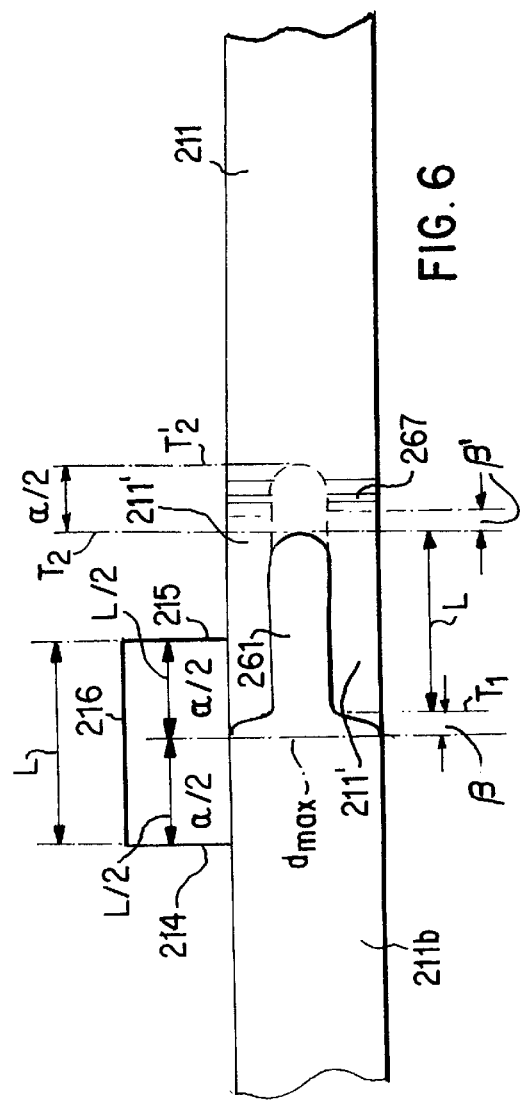

US 6,560,823 B1

METHOD FOR OPTIMIZING THE LENGTH OF THE BLANK FOR AN OPEN-TYPE CLAMP AND CLAMP MADE WITH THE USE OF THIS METHOD

FIELD OF THE INVENTION

The present invention relates to a method for optimizing the length of a blank for an open-type clamp and to clamps made with this method, especially clamps provided with an arrangement avoiding any gaps, steps or discontinuities at the internal clamping surfaces.

BACKGROUND OF THE INVENTION

As explained in my U.S. Pat. No. 6,240,603, the length of the blank for a given nominal size clamp is important for economic reasons. Even if only clamping band material of the order of millimeters can be economized, the overall cost factor becomes significant by reason of the large quantity of mass-produced clamps of this type which amount to hundreds of millions of clamps per year. As also explained in my aforementioned patent, the length of the section of the clamping band from the end of the outer band portion to the beginning of the tightening device, such as a plastically deformable "Oetiker" ear can be optimized with the use of information well known in the art, depending also on the type of the connection between the inner and outer band portions which are normally provided within this area. This means that any savings in band material must be realized in the selection of the length of the overlapped inner band portion.

As known in the art, arrangements for avoiding gaps, steps or discontinuities at the inner clamping surfaces of open clamps, such as, for example, the step produced at the end of the inner clamping band portion, should be avoided to preclude any likelihood of leakage, especially with the use of relatively hard, thin plastic hoses, as used, for example, in the automotive industry. These arrangements usually involve mutually complementary profiles at the end of the inner band portion and in the overlapping outer band portion interacting in a particular manner. U.S. Pat. No. 4,299,012 to Oetiker discloses one embodiment of such an arrangement which has proved commercially extraordinarily successful in hundreds of millions of clamps and which utilizes a male profile in the form of a tongue-like extension at the inner band end adapted to engage in a female profile formed by an opening in a step-like portion of the outer band portion whereby the height of the step corresponds substantially to the thickness of the clamping band. FIG. 1 of this application illustrates such a clamp of the open type as disclosed in U.S. Pat. No. 4,299,012 in which the clamping band (11) includes overlapping outer and inner clamping band portions (11a and 11b) fixed relative to one another by the mechanical connection consisting of a guide hook (31) and two cold-deformed, deep-drawn support hooks (32) extending outwardly from the inner band portion (11b) and adapted to engage in openings (35) provided in the outer band portion. The tightening device in the form of a so-called "Oetiker" ear and generally designated by reference numeral (13) includes outwardly extending leg portions interconnected by a bridging portion (16) provided with a reinforcing means (17) of any known type. The outer band portion includes thereby a step-like portion (67) of a height substantially corresponding to the thickness of the clamping band material and provided with an opening for engagement by the tongue-like extension (61) at the end of the inner clamping band portion (11b). The opening is thereby formed by longitudinal cuts (64) extending in the longitudinal direction of the clamping band whereby the material remaining after the cuts can either be pressed-out into a cover (63) or cut off as disclosed in the prior U.S. Pat. No. 4,315,348.

A different approach to the use of a tongue-like extension as shown in FIG. 1 of this application involved a profile with a fork-like configuration at the end of the inner band portion as disclosed in U.S. Pat. No. 4,237,584 to Oetiker. This concept for a stepless arrangement was then adopted in U.S. Pat. No. 4,750,242 to Calmettes et al. in which a profile with a U-shaped configuration at the end of the inner clamping band portion engaged with a so-called boss in the outer clamping band portion and of a shape complementary to the U-shaped configuration. However, the clamp as disclosed in U.S. Pat. No. 4,750,242 involves a potential leakage problem which was resolved with the use of a clamp involving my invention, as disclosed in my copending provisional application Serial No. 60/266,849, filed Feb. 7, 2001, and entitled "Hose Clamp With Internal Clamping Surface Devoid of Steps or Gaps" and in my copending Utility Application (D/21586) Ser. No. 10/026,715, filed Dec. 27, 2001, and entitled "Method of Making Hose Clamps with Internal Clamping Surfaces Devoid of Steps or Gaps and Products Made By Such Method." FIG. 2 of this application, in which reference numerals of the 100 series are used, shows a clamp according to my invention as disclosed in the aforementioned copending application which includes a profile with a U-shaped configuration (151, 152) at the end of the inner clamping band portion (111b) adapted to engage with a deep-drawn depression or indentation generally designated by reference numeral (160) with a depth substantially corresponding to the thickness of the band material. The remaining lateral band portions (111') thereby pass over into the level of the internal clamping surface (160a) at the step-like portions (167) so that the internal clamping surface (160a) and the continuation of the internal clamping surface of the clamping ring (111) continue at the same level. The subject matter of my copending Provisional Application Serial No. 60/266,849 and of my aforementioned Utility Application (D/21586) Ser. No. 10/026,715 are hereby expressly incorporated in their entirety into this application.

It has also been recognized in the prior art that the opening underneath the tightening device, such as a so-called "Oetiker" ear should be bridged by the full band width of the inner clamping band portion to avoid possible leakage problems as a result of a bulging out of the clamping band under strong internal pressure forces if the gap is bridged— even only partially—by less than the full width inner clamping band portion, for example, by the tongue-like extension as disclosed in German Gebrauchsmuster GM 75 41 277.

SUMMARY OF THE INVENTION

The construction of the prior art clamps was based on the belief that any gap underneath the tightening device must be covered by the full width inner clamping band portion at least already at the time the mechanical connection between inner and outer clamping band portions is established and before any tightening of the tightening device has been commenced.

In contradistinction thereto, the present invention is based on the recognition that any gap underneath the tightening device in clamps with a predetermined tolerance range must not be covered in its entirety by the full band width under conditions of established mechanical connection and not-yet-tightened tightening device. Instead, significant savings in clamping band material necessary for a blank can be achieved if the beginning of the complementary profile at the inner clamping band portion away from the free end thereof is located at a predetermined point within the area of the gap with the mechanical connection engaged and with a not-yet-tightened tightening device. This location is determined according to an important feature of this invention by the extent of contraction of the tightening device necessary to produce a predetermined clamping force for the maximum diametric dimension in the tolerance range of a clamp of nominal clamp size.

Accordingly, the method according to the present invention resides in determining the amount of contraction of the tightening device necessary to achieve a predetermined clamping force for the maximum diametric dimension $d_{max}$ in the tolerance range and to locate the beginning of the complementary profile on the inner clamping band portion in relation to this location as will be described more fully hereinafter.

The clamp produced by the method according to this invention is characterized by the fact that the blank is so configured that the beginning of the complementary profile for the gap-free and stepless arrangement is located in the inner band portion at a particular location within the area of the gap underneath the tightening device which is determined in relation to the extent of tightening of the clamp necessary for realizing a predetermined clamping force for $d_{max}$ with the mechanical connection engaged and the tightening device tightened to that point.

Accordingly, it is a primary object of the present invention to provide a method and product which permits additional savings in clamping band material for so-called open-type clamps with a tolerance range.

BRIEF DESCRIPTION OF THE DRAWINGS

These and further objects, features and advantages of the present invention will become more apparent from the following description when taken in conjunction with the accompanying drawings which shows, for purposes of illustration only, several embodiments in accordance with the present invention, and wherein:

FIG. 5 is a somewhat schematic partial plan view on a prior art clamp of the type shown in FIG. 3 and with the mechanical connection engaged and the tightening device not yet tightened, the parts being showing in the plane of the drawing for easier understanding;

FIG. 6 is a somewhat schematic partial plan view, similar to FIG. 5, and illustrating the present invention;

DETAILED DESCRIPTION OF THE DRAWINGS

Figure 3:
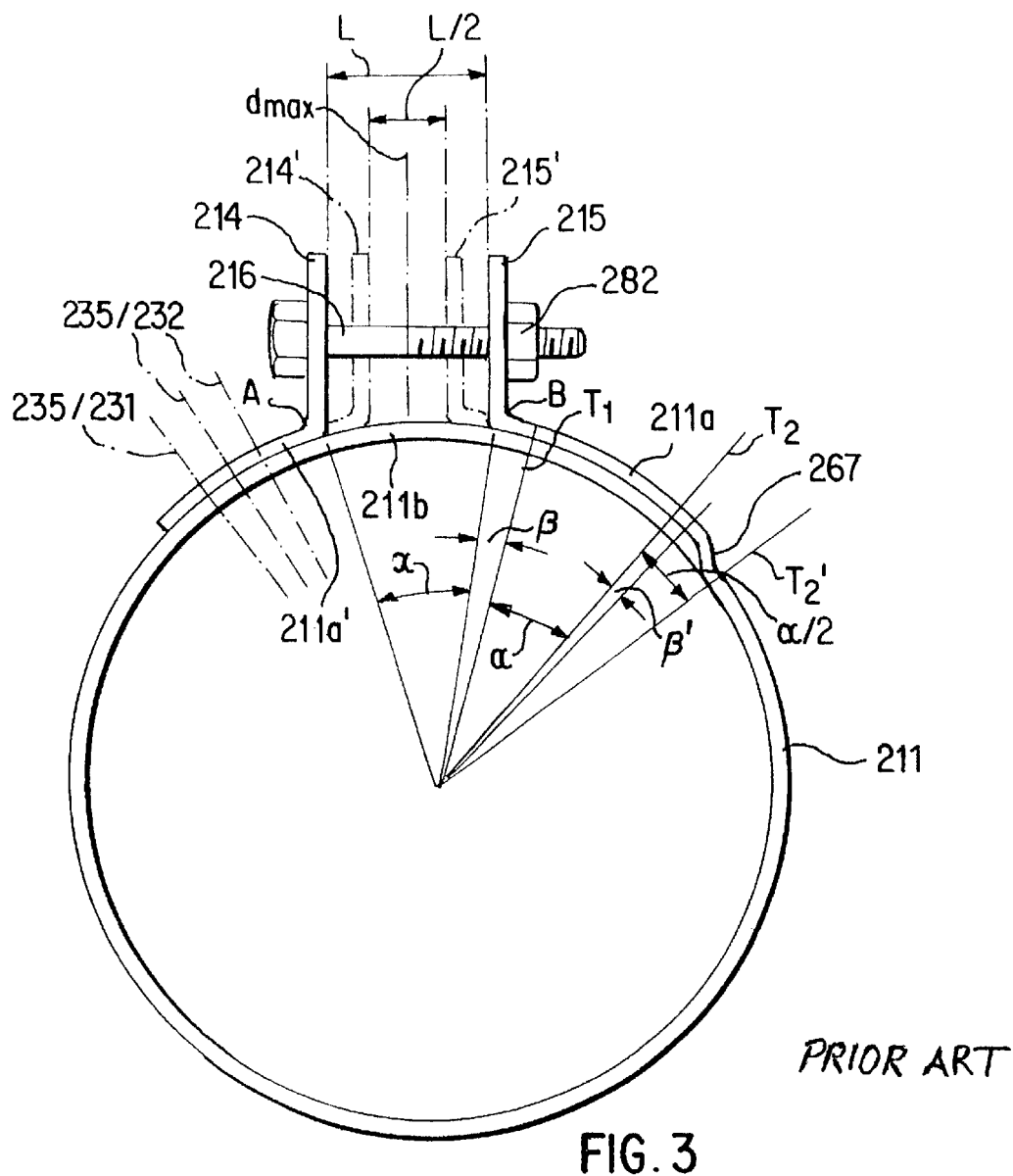
FIG. 3 is a somewhat schematic axial elevational view of a screw-type clamp based on the teachings of the prior art.
Figure 4:
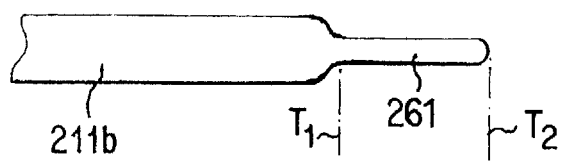
FIG. 4 is a partial plan view on the inner clamping band portion provided with a male profile having a configuration in the form of a tongue-like extension at the inner clamping band end.

Referring now to the drawing wherein like reference numerals are used throughout the various views to designate like parts, FIG. 3 illustrates a screw-type clamp of the type shown in FIG. 40 of U.S. Pat. No. 4,299,012. However, what is said with respect to this figure is equally applicable also to clamps of the type shown in FIG. 1 of this application, to the embodiments of my aforementioned copending application and to all prior art open-type clamps with similar features. A screw-type clamp is chosen herein for purposes of explaining the differences between the prior art and this invention because of easier illustration and facilitated understanding. The clamp of FIG. 3 includes a clamping band 211 in which the two-partite outer clamping band portion 211a' and 211a includes outwardly extending leg portions 214 and 215 interconnected by a bolt 216 and a nut 282 which correspond to the bridging portion in an "Oetiker"-type plastically deformable ear although the extent of tightening of the respective tightening devices involves different considerations to achieve the predetermined clamping forces for $d_{max}$. The mechanical connection between the inner clamping band portion 211b and the outer clamping band portion 211a' may be of any known type and is therefore only schematically indicated by reference numerals 231, 232 and 235. The outer clamping band portion 211a includes a step-like portion 267 provided with an opening that forms the female profile and serves for engagement by the tongue-like extension 261 at the end of the inner band portion 211b which forms the male profile. The beginning of the tongue-like extension away from the free end of the tongue-like extension is indicated by $T_1$ and the end thereof by $T_2$ (FIGS. 3 and 4). In FIG. 3, the length of the gap underneath the tightening device 214, 215, 216, 282 is indicated by the distance L and the corresponding angle $\alpha$ subtending the arc between the corners A and B where the arcuate outer clamping band potions 211a' and 211a pass over into outwardly extending leg portions 214 and 215. According to the prior art the point $T_1$ of the inner clamping band portion is located clockwise beyond the gap underneath the tightening device 214, 214, 216, 282 by a distance corresponding to a safety angle $\beta$ when the mechanical connection 231, 232, 235 is engaged and before the tightening device is tightened. For purposes of explaining this invention only, it is further assumed that the predetermined clamping force for the maximum diameter $d_{max}$ of the clamp's tolerance range indicated in FIG. 3 in dash lines is reached when the gap is tightened to half of its initial length (L/2) and the minimum diametric dimension $d_{min}$ of the tolerance range is reached when the tightening device is tightened so that the leg portions 214 and 215 abut against one another. In other words, $d_{max}$ is reached when the tightening device is tightened to its maximum possible extent, i.e., when the bolt 216 and nut 282 are tightened by an amount equal substantially to the angle $\alpha$ when the leg portions 214 and 215 abut at one another. Given the assumption of this example, chosen only for purposes of explanation, one arrives at the following dimensional criteria for the layout of the blank. The beginning of the step-like portion 267 must be located in the outer clamping band portion from the point $T_1$ by a distance at least equal to the arc α as the full band width inner clamping band portion must be able to reach its position $d_{min}$ ahead of the beginning of the step-like portion 267, preferably again by a safety arc β' which may be equal to or differ from safety angle β. On the other hand, when the tightening device 214, 215, 216 reaches its $d_{max}$ position at α/2, the end $T_2$ of the male configuration 261 must have moved clockwise to a point $T_2$, some distance beyond the step-like portion 267 for reliable gap-free and stepless operation. This means that the end $T_2$ of the male profile 261 must be located in the non-tightened condition but with the mechanical connection engaged at a distance equal to L/2, i.e., α/2 from the point $T_2$, in the counterclockwise direction.

Figure 1:
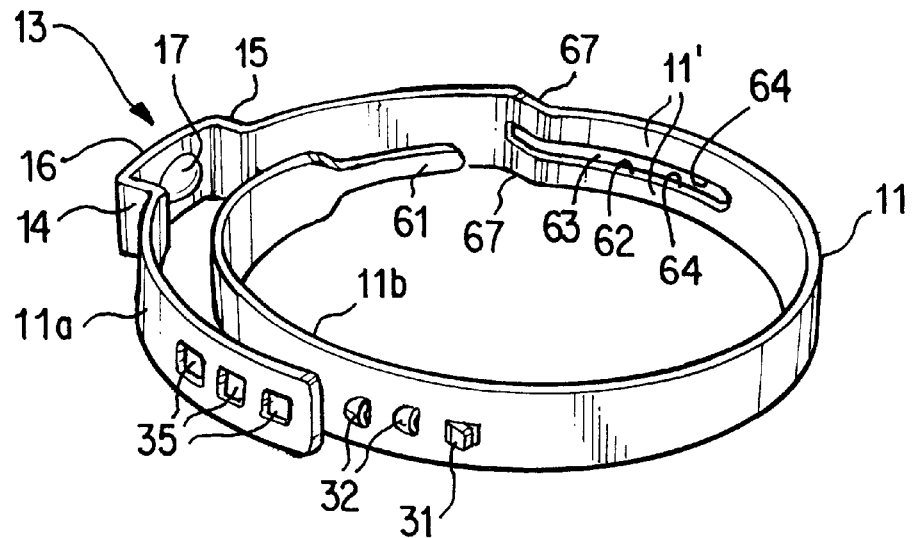
FIG. 1 is a somewhat schematic perspective view of a prior art clamp as disclosed in U.S. Pat. No. 4,299,012 and provided with an arrangement to produce a stepless and gap-free internal clamping surface with the use of a male profile in the form of a tongue-like extension at the end of the inner band portion.

The point $T_2$ in FIG. 3 determines the length of the clamping band necessary also for any open-type clamps with analogous features such as, for example, a clamp of the type illustrated in FIG. 1 of this application because the total length of clamping band material necessary for the blank of such a clamp is the length from the free end of the outer clamping band portion 11a (FIG. 1) to the free end of the tongue-like extension 61. As the clamping band material from the free end of the outer clamping band portion to the inner end of the leg portion 14 can be optimized in accordance with known design criteria and as the clamp must have a certain diametric dimension when the mechanical connection is engaged but before tightening of the tightening device is commenced in order to allow axial installation of the clamp over a hose, the total length of the blank depends on the length of the overlapped inner clamping band portion including the location of the complementary profile, in the embodiment of FIG. 1, the location and length of the tongue-like extension. As clamps are usually already preassembled before axial mounting over the hose by engagement of the mechanical connection 31, 32 and 35, the point $T_2$ is determinative of the overall length of the blank.

FIG. 5 illustrates somewhat schematically the prior art of a clamp according to either FIG. 1 or FIG. 3 whereby the leg portions 14, 15 or 214, 215 as also the bridging portion 16 or the quasi-bridging portion 216 are schematically indicated for facilitated understanding of the invention.

Figure 7:
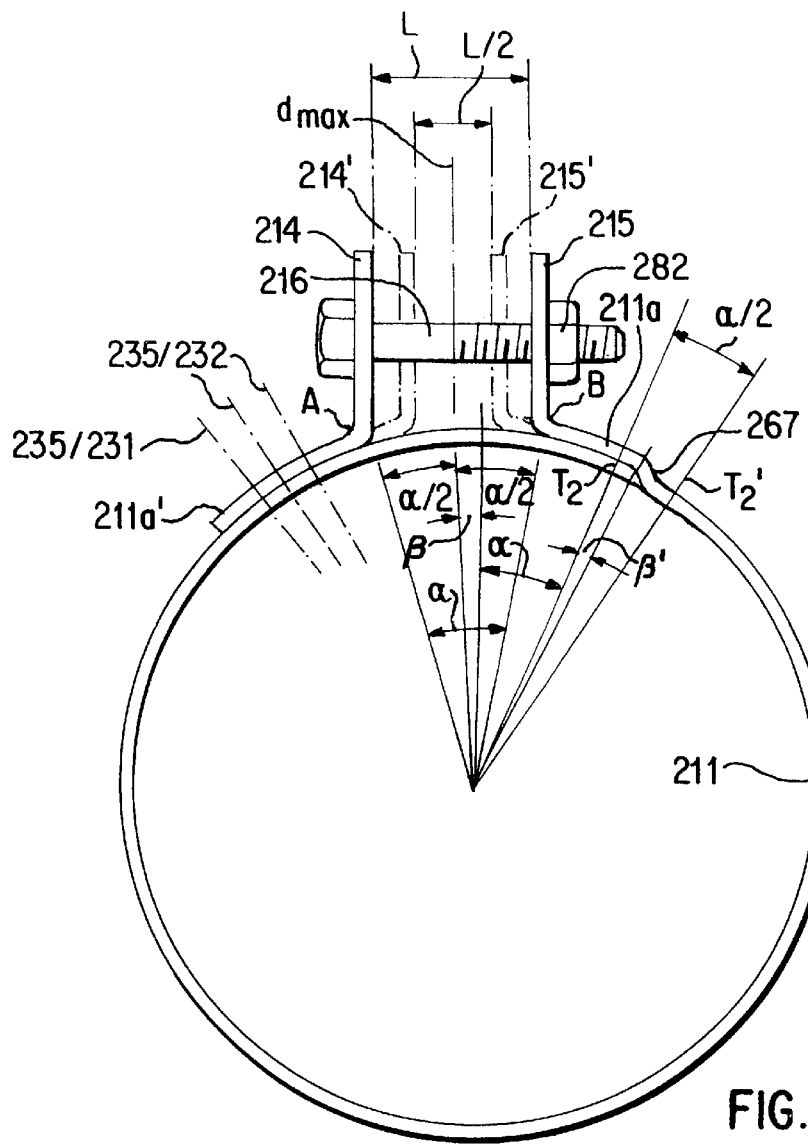
FIG. 7 is a somewhat schematic partial axial view, similar to FIG. 3, but illustrating the present invention as explained by reference to FIG. 6.

In the embodiment of this invention, illustrated in FIGS. 6 and 7, the same assumptions are made as for the prior art embodiment of FIGS. 1, 3 and 5, i.e., maximum diametric dimension $d_{max}$ of the tolerance range of the clamp is reached at L/2 or α/2 and the maximum contraction of the tightening device, i.e., $d_{min}$ is reached when 14, 15 or 214, 215 abut at one another. However, contrary to the prior art, the point $T_1$, i.e., the beginning of the complementary profile (the tongue-like extension 61 or 261) away from the free end thereof is now located within the area of the gap, and more particularly to the right of the $d_{max}$ line by a distance equal to the angle β which can be empirically determined to assure reliable coverage of the gap underneath the tightening device when contraction of the clamp reaches $d_{max}$. The angle β may be the same as the angle β in FIG. 3 but can be optimized empirically; as a rule of thumb, the angle β in this invention may be about 4° C. to about 15° C., preferably between about 6° C. to about 10° C.

Applying the same considerations to the embodiment of FIGS. 6 and 7 as to the embodiment in FIGS. 1, 3 and 5, the step-like portion 267 is now located at an angle or distance from the point of $d_{max}$ in the clockwise direction equal to α (L) plus again a safety factor equal to the angle β', the point $T_2$. must again be located at a safe distance beyond the end of the step-like portion 267, as viewed in the clockwise direction when the tightening device 214, 215, 216 is tightened to the point $d_{max}$, which, in turn, locates the point $T_2$, i.e., the free end of the complementary profile at the inner clamping band portion 11b or 211b at a distance equal to α/2 in the counterclockwise direction as viewed in FIG. 7.

In the embodiment according to this invention illustrated in FIGS. 6 and 7, the point $T_1$ is therefore located a distance quite a bit closer to the point A (214) as can be seen from a comparison with FIGS. 5 and 6 which are drawn to similar scale.

Even though the savings in clamping band material may be only of the order of millimeters depending on the size of the clamp and the length L of the gap under the tightening device, depending in turn on the nominal size of the clamp and the tolerance range, if these savings are multiplied by the hundreds of millions of clamps manufactured each year, it can entail a significant savings in material costs.

Figure 2:
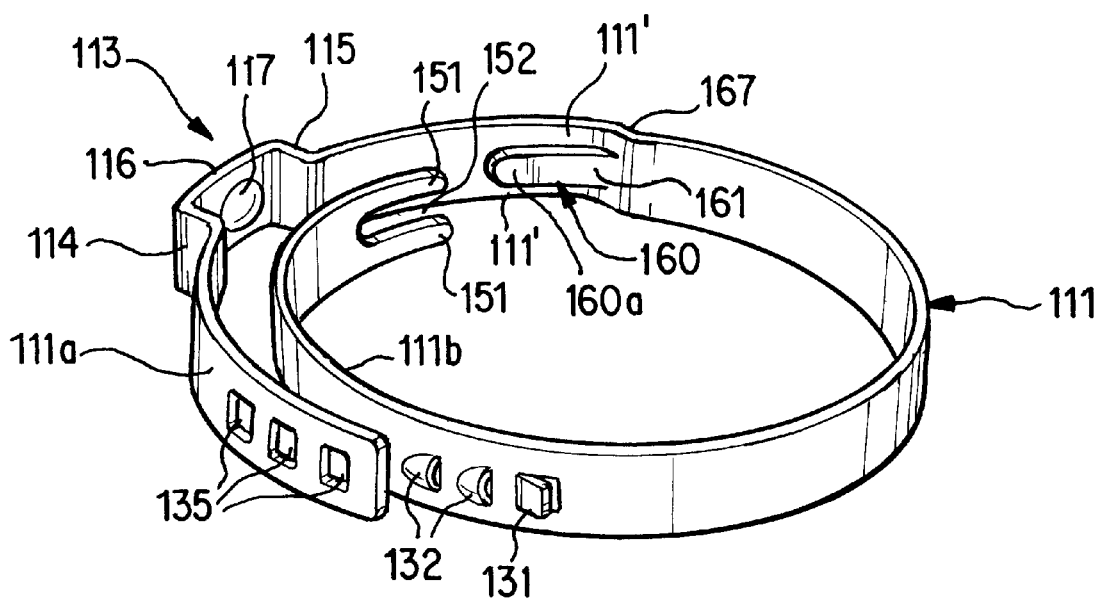
FIG. 2 is a somewhat schematic perspective view of a modified embodiment of a clamp provided with a female profile in the form of a U-shaped configuration at the end of the inner clamping band portion adapted to engage with an indentation in the outer clamping band portion to provide a stepless and gap-free inner clamping band surface as disclosed in my copending Provisional Application Serial No. 60/266,849 and in my aforementioned my Utility application Ser. No. 10/026,715 (D/21586)
Figure 8:
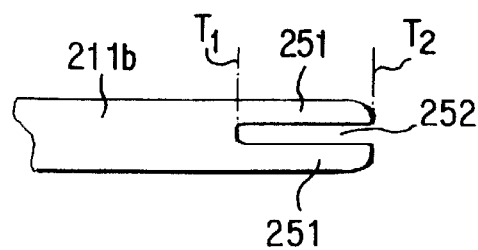
FIG. 8 is a partial plan view on the inner clamping band portion provided with a female profile having a U-shaped configuration at the end of the inner clamping band portion.

Similarly, savings can be achieved with a clamp illustrated in FIG. 2 by applying analogous considerations to the design of the clamp as applied to the embodiments of FIGS. 1, 6 and 7 with the same assumption that $d_{max}$ is reached at α/2. FIG. 8 thereby illustrates the location of points $T_1$ and $T_2$ in the U-shaped female profile provided at the end of the inner clamping band portion. The point $T_1$ is again chosen in dependence on the amount of contraction of the clamp, i.e., on the extent of tightening of the tightening device necessary to reach $d_{max}$ plus again a safety factor corresponding to an angle β. The following deliberations apply in that case. To assure proper operation of the clamp during tightening of the tightening device in the original condition, i.e., with the mechanical connection engaged and before tightening is commenced, there should be an overlap between the inner and outer band portions 211b and 211a in this condition. This means that the point $T_2$ should already be located a safe distance in the clockwise direction beyond the leg portion 215 corresponding to an angle β which can be empirically determined. As the $d_{max}$ point is reached after tightening the tightening device by contraction through an angle α/2, the point $T_1$ must be located in the original condition within the area of the gap underneath the tightening device at a distance from the leg portion 215 as viewed in the counterclockwise direction corresponding to an angle equal to α/2 minus the angle β. In the condition of $d_{max}$ a reliable overlap corresponding to an angle δ must exist between the female profile 251, 252 and the indentation 260, i.e., $T_2$. must overlap with indentation 260 by a distance corresponding to the angle δ. Moreover, the tine-like parts 251 must then be able to move also to the point $d_{min}$ i.e., through another angle α/2 from the point of $d_{max}$ without obstruction by the step-like portions 267. The length of the indentation 260 must therefore be equal to the angle of overlap δ plus the angle α/2 plus another small angle representing a safety factor. This then also locates the step-like portions 267 in the outer clamping band portion. The parameters of the length of the female profile and the location of the step-like portions 267, however, may also be changed somewhat depending on the acceptable closeness of the beginning of the depression 260 with respect to respect to the leg portion 215. It should also be noted again that the beginning of the step-like portions 267 must be located from point $T_2$, at $d_{min}$ at a distance equal to angle α/2 plus a safety factor β as viewed in the clockwise direction to permit the tine-like parts 251 to move freely over the entire range of contraction of the clamp (α) without obstruction by the step-like portions 267. The point $T_2$ should now come to lie ahead of the beginning of the step-like portions 267, preferably by a small safety factor β, when the clamp is tightened to the point $d_{min}$ and the length of the depression 260 must be such that a reliable overlap exists between the complementary profiles 251, 260 when $d_{max}$ is reached during tightening.

The point of $d_{max}$ in a given tolerance range for a clamp of nominal size can be readily determined empirically and depends on such factors as type of tightening device, for example, whether a screw-type clamp or a plastically deformable ear is used, on the clamping band material and on the thickness of the clamping band material. The point of tightening at $d_{max}$ normally occurs somewhat earlier with screw-type clamps than with clamps equipped with plastically deformable ears which may require a deformation corresponding to a reduction in the angle α of the bridging portion of about 40% to about 60%, again depending on such factors as type of material, thickness of clamping band, type of reinforcing means in the bridging portion, etc. For similar reasons the various angles representing safety factors are also best determined empirically for a given type of clamp, bearing in mind that these safety angles should be kept as small as possible to maximize the savings in clamping band material.

The danger of any bulging out of the complementary profile at the inner clamping band portion into the gap underneath the tightening device as the tightening device is tightened, i.e., as the point $T_1$ of the complementary profile at the end of the inner clamping band portion moves toward point B during tightening of the clamp, can be readily minimized, if at all necessary, by reducing any existing friction between the outer surface of the profile at the end of the inner clamping band potion and the inner surface of the outer clamping band portion between point B and the step-like portion. For example, the affected areas of the clamping band may be provided with a coating of a fast-drying anti-friction solution, such as, for example, Teflon® or silicon-based solutions. Additionally or in the alternative, contact between the inner and outer clamping band portions can also be limited by point-like pressed-out portions which limit the contact areas between overlapping band portions in the area to the right of leg portion 215 as viewed in FIGS. 3 and 7. For purposes of mass production, the band may be passed through a bath containing the anti-friction solution after the blank is cut but before deformation of the blank begins. As the anti-friction coating is needed only in a very limited area, it may also be applied by spraying only the outer surface of the end area of the inner clamping band portion as the band material unrolls from the spool or as the cut blank moves toward the deformation station. The spraying may thereby be coordinated time-wise by conventional means to the speed of movement of the band material so as to cover only the desired areas of the clamping band.

While I have shown and described several embodiments in accordance with the present invention, it is understood that the same is not limited thereto, but is susceptible of numerous changes and modifications as known to those skilled in the art. This invention is applicable to any so-called open clamp with a tightening device provided with a gap underneath the same which has to be bridged in the position of $d_{max}$ of the tolerance range of the clamp by the full band width of the overlapped inner clamping band portion. For example, the present invention is also applicable to all of the clamps as disclosed in my aforementioned application as also to screw-type clamps of the type disclosed in the prior U.S. Pat. No. 4,521,940. I therefore do not wish to be limited to the details shown and described herein but intend to cover all such changes and modifications as are encompassed by the scope of the appended claims.

What is claimed is:

1. A method for optimizing the length of the blank for an open-type clamp with a nominal diameter size d and a given tolerance range from $d_{max}$ to $d_{min}$, the clamp including a clamping band whose clamping band end portions are intended to overlap in the installed condition to form an inner and an outer end portion, a connection for connecting the overlapping end portions, a tightening device for tightening the clamp which forms a gap of initial length on the inside thereof to be covered in the condition of $d_{max}$ of the clamp by the full band width of the inner clamping band end portion, and further means including mutually complementary male and female profiles to assure a substantially gap-free and stepless internal clamping surface with one of male and female profile terminating at the inner clamping band portion and one of female and male profile provided in the outer clamping band portion, comprising the steps of determining the amount of tightening necessary to reach $d_{max}$ and the reduction of the length of the gap caused thereby and locating the beginning of the profile in the inner band portion away from the free end of the inner clamping band portion within the area of the remaining reduced length of the gap.

2. A method according to claim 1, wherein said beginning of the profile in the inner band portion is located at such point in said remaining gap area that the gap is covered by the full band width of the inner clamping band portion when the connection is engaged and the tightening device has been tightened to reach the position of $d_{max}$.

3. A method according to claim 2, further comprising the step of locating said male and female profiles in said clamping band portions in such a manner that a mutual engagement exists therebetween when the tightening device has been tightened to the position of $d_{max}$.

4. A method according to claim 3, further comprising the step of selecting a length for the profile at the inner clamping band end portion that corresponds substantially to a length of the initial length of the gap less the reduction of the gap caused when reaching $d_{max}$.

5. A method according to claim 3, further comprising the step of selecting a length and location of the profile in the outer clamping band portion in such a manner as to provide engagement between the profiles at the inner and outer clamping band portions over the tolerance range from $d_{max}$ to $d_{min}$.

6. A method according to claim 3, further comprising the step of locating the beginning of the profile in the outer clamping band portion at such a distance from the tightening device that the full band width of the inner clamping band portion can travel freely to the point corresponding to $d_{min}$.

7. A method according to claim 1, further comprising the step of locating said male and female profiles in said clamping band portions in such a manner that a mutual engagement exists therebetween when the tightening device has been tightened to the position of $d_{max}$.

8. A method according to claim 1, further comprising the step of selecting a length for the profile at the inner clamping band end portion that corresponds substantially to a length of the initial length of the gap less the reduction of the gap caused when reaching $d_{max}$.

9. A method according to claim 8, further comprising the step of selecting a length and location of the profile in the outer clamping band portion in such a manner as to provide engagement between the profiles at the inner and outer clamping band portions over the tolerance range from $d_{max}$ to $d_{min}$.

10. A method according to claim 1, further comprising the step of locating the beginning of the profile in the outer clamping band portion at such a distance from the tightening device that the full band width of the inner clamping band portion can travel freely to the point corresponding to $d_{min}$.

11. A blank for an open-type clamp whose one end is intended to form an outer clamping band portion and whose other end is intended to form an inner clamping band portion overlapped by the outer clamping band portion in the installed condition, comprising a connection between the inner and outer clamping band portion, a tightening device in the outer band portion with a gap formed underneath the same, and an arrangement in said inner and outer clamping band portions to assure a gap-free and stepless inner clamping surface in the installed and tightened condition, said arrangement including mutually complementary profiles in the inner and outer clamping band portions, said clamp having a tolerance range of $d_{max}$ to $d_{min}$ in which predetermined clamping forces are produced in the clamp, the complementary profile at the end of the inner clamping band portion having a beginning and an end of predetermined length, the beginning of said complementary profile in the inner clamping band portion away from the free end thereof being located such that it comes to lie at a predetermined location within the gap underneath the tightening arrangement when the mechanical connection is engaged and the tightening device is not yet tightened, said location being determined as a function of the extent of tightening when $d_{max}$ is reached during tightening of the tightening device.

12. A blank according to claim 11, wherein said location is so chosen that the gap is bridged by the full width inner band portion when the tightening device is tightened to the point of $d_{max}$.

13. A blank according to claim 12, wherein the length of the complementary profile in the inner band portion is so chosen that a reliable overlap exists between the mutually complementary profiles when the tightening device is tightened to the point of $d_{max}$.

14. A blank according to claim 13, wherein the complementary profile in the inner band portion is a male profile.

15. A blank according to claim 14, wherein said male profile is a tongue-like extension.

16. A blank according to claim 15, wherein the complementary profile in the outer clamping band portion is an opening in a step-like part.

17. A blank according to claim 13, wherein the complementary profile at the end of the inner clamping band portion is a female profile.

18. A blank according to claim 17, wherein said female profile is of substantially U-shape adapted to engage with a male pressed-out depression in the outer clamping band portion.

19. A blank according to claim 11, wherein the complementary profile in the inner band portion is a male profile.

20. A blank according to claim 19, wherein said male profile is a tongue-like extension.

21. A blank according to claim 20, wherein the complementary profile in the outer clamping band portion is an opening in a step-like part.

22. A blank according to claim 11, wherein the complementary profile at the end of the inner clamping band portion is a female profile.

23. A blank according to claim 22, wherein said female profile is of U-shape adapted to engage with a male pressed-out depression in the outer clamping band portion.

* * * * *